United States Patent
Choi

[19]
[11] Patent Number: 5,986,695
[45] Date of Patent: Nov. 16, 1999

[54] RECORDING METHOD AND APPARATUS FOR CONSERVING SPACE ON RECORDING MEDIUM OF SECURITY SYSTEM

[75] Inventor: Ki-young Choi, Yongin, Rep. of Korea

[73] Assignee: Samsung Electronics Co., Ltd., Suwon, Rep. of Korea

[21] Appl. No.: 08/901,103

[22] Filed: Jul. 28, 1997

[30] Foreign Application Priority Data

Jul. 27, 1996 [KR] Rep. of Korea ...................... 96-30885

[51] Int. Cl.⁶ .................................................. H04N 7/18
[52] U.S. Cl. ........................ 348/155; 348/143; 348/154; 360/5
[58] Field of Search ........................... 348/143, 148–156, 348/159, 700, 169, 208, 214, 219; 360/5; 386/35

[56] References Cited

U.S. PATENT DOCUMENTS

| | | | |
|---|---|---|---|
| 4,160,998 | 7/1979 | Kamin | 348/155 |
| 4,458,266 | 7/1984 | Mahoney | 348/155 |
| 4,614,966 | 9/1986 | Yunoki et al. | 348/282 |
| 4,774,570 | 9/1988 | Araki | 348/154 |
| 4,851,904 | 7/1989 | Miyazaki et al. | 348/700 |
| 4,949,173 | 8/1990 | Mitsuhashi | 348/143 |
| 4,977,451 | 12/1990 | Besnard | 348/149 |
| 5,027,201 | 6/1991 | Bernard | 348/702 |
| 5,091,781 | 2/1992 | An | 348/169 |
| 5,144,661 | 9/1992 | Shamosh et al. | 380/9 |
| 5,455,561 | 10/1995 | Brown | 348/154 |
| 5,471,239 | 11/1995 | Hill et al. | 348/155 |
| 5,539,528 | 7/1996 | Tawa | 348/143 |
| 5,666,157 | 9/1997 | Aviv | 348/152 |
| 5,880,775 | 3/1999 | Ross | 348/143 |
| 5,880,776 | 3/1999 | Kim | 348/155 |

*Primary Examiner*—Vu Le
*Attorney, Agent, or Firm*—Robert E. Bushnell, Esq.

[57] ABSTRACT

A recording apparatus and process for conserving space on a recording medium of a security system includes the steps of detecting a motion amount from the image picked up by a camera, while recording the image, comparing the detected motion amount to a predetermined threshold, and increasing a counted value when the motion amount is equal to or lower than the predetermined threshold, and resetting the counted value when the motion amount is higher than the predetermined threshold, and comparing the counted value to a reset value, and when the former is higher the latter, rewinding until the counted value becomes zero, and then return to the step of detecting a motion amount. Therefore, motion of a recorded image signal is detected and compared. A recorded part is found, in which no motion occurs for a predetermined period of time. Recording is again performed, to overwrite this part where no motion occurred. This increases the available recording time, and economizes use of space of the recording medium.

20 Claims, 3 Drawing Sheets

RECORDING METHOD AND APPARATUS FOR CONSERVING SPACE ON RECORDING MEDIUM OF SECURITY SYSTEM

CLAIM FOR PRIORITY

This application makes reference to, incorporates the same herein, and claims all benefits accruing under 35 U.S.C. §119 from my application for RECORDING METHOD FOR CONSERVING SPACE ON RECORDING MEDIUM OF SECURITY SYSTEM earlier filed in the Korean Industrial Property Office on the 27$^{th}$ day of July 1996, and there duly assigned Ser. No. 96-30885, a copy of which application is annexed hereto and made a part hereof.

BACKGROUND OF THE INVENTION

1. Field of the Invention

The present invention relates to processes and apparatus for recording image signals onto a recording medium, and more particularly, to processes and apparatus dedicated to conservation of space on a recording medium of a security system.

2. Description of the Related Art

In general, a signal obtained by monitoring a volume using a security camera, can optionally be recorded onto a recording medium, and then the recorded images are reproduced to be used as reference material in order to review an abnormal situation, such as, by way of example, the occurrence of a fire within, or an unauthorized entry into, the secured volume during the observation. Earlier efforts in the art included the Electronic Still Camera For Generating Long Time Exposure By Adding Results Multiple Short Time Exposures, U.S. Pat. No. 4,614,966 by Y. Yunoki, et alii; the Motion Detecting Circuit For Digital Video Signal, U.S. Pat. No. 4,851,904 of T. Miyazaki, et alii; the Camera Moving Apparatus, U.S. Pat. No. 5,091,781 of B. An; the Video Movement Detector, U.S. Pat. No. 4,458,266 of T. W. Mahoney; the Motion Detection Apparatus As For An Interlace To Non-Interlace Scan Converter, U.S. Pat. No. 5,027,201 of F. S. Bernard; and the Security Protection System And Method, U.S. Pat. No. 5,144,661 of Robert Shamosh, et alii.

I have found however, that recording media have finite capacity that typically prevents recordation of the entire sequence of events within the secured volume during the period of observation. Efforts have been made to minimize the problem in conventional security systems caused by the limited recording time imposed by the finite capacity of the recording medium, by recording only at predetermined intervals. These efforts can not however, indefinitely enlarge the limited recording time available with contemporary systems. Also, no recording will be available of any abnormal situation that occurs during a time interval when recording was not performed.

SUMMARY OF THE INVENTION

Accordingly, to solve the above problems, it is an object of the present invention to provide an improved process and apparatus for recording image signals onto a recording medium.

It is another object to provide a process and apparatus dedicated to conservation of space on a recording medium of a security system.

It is still another object to provide a process and apparatus for conserving space on a recording medium of a security system by recording data and images for a predetermined period of time.

It is yet another object to provide a process and apparatus for checking the motion components of images of objects under surveillance.

It is still yet another object to provide a process and apparatus for overwriting portions of a recording media containing previously recorded images and data that exhibit insubstantial motion within the volume under surveillance.

It is a further object to provide a process and apparatus for checking whether a recording of a volume under surveillance contains a motion component, and recording a subsequent interval of surveillance over the earlier recording when the motion component of the earlier recording shows little or no motion.

These and other objects can be accomplished in a first embodiment, with a recording apparatus and process that exploits the limited capacity of the recording medium of a security system by detecting the amount of motion from the images picked up by a camera, while recording the image; comparing the amount of motion detected with a predetermined threshold value, and increasing a counted value when the amount of motion detected is equal to or lower than the predetermined threshold value, and resetting the counted value when the amount of motion is higher than the threshold value; and comparing the counted value to a reset value. When the former is higher than the latter, earlier recorded portions of the recording medium are addressed (e.g., if the recording medium is a tape, the tape is rewound) until the counted value becomes zero, and the apparatus and process then returns to the step of detecting the amount of motion.

These and other objects can also be attained with a second embodiment of the present invention able to conserve space on a recording medium of a security system by detecting the amount of motion from the images picked up by a camera while recording the image; comparing the amount of detected motion to a predetermined threshold value; storing track data corresponding to the track being recorded at that moment when the amount of motion has a value equal to or lower than the threshold value, and then beginning a count; deleting the track data stored in the memory and resetting the counter when the amount of motion detected is higher than the threshold value; and comparing the value of the count to the reset value, and reading the track data stored in the memory when the counted value is higher than the reset value, and then moving the recording point to the position of the storage track.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
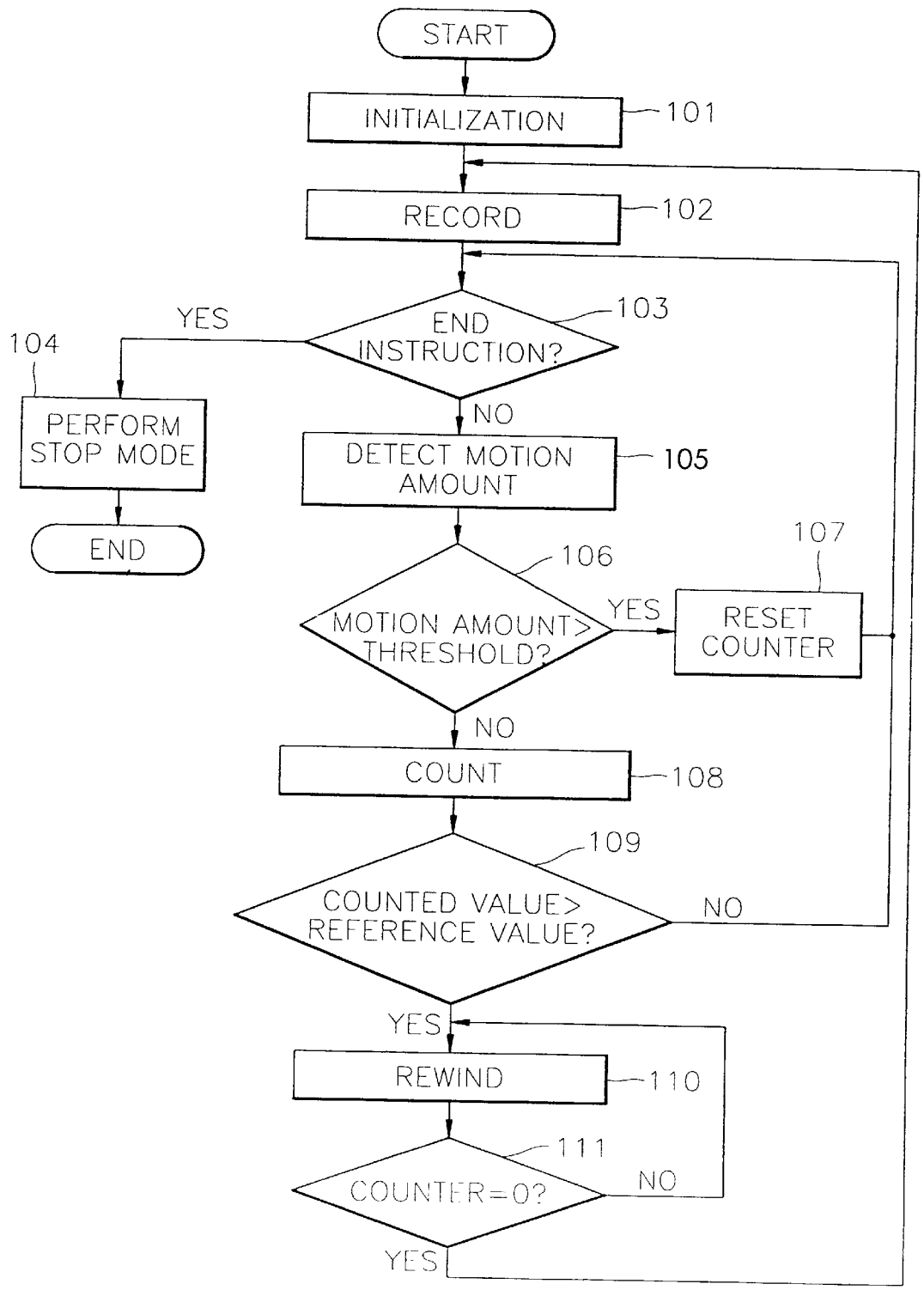
FIG. 1 is a flowchart of a process for recording data while conserving space on a recording medium of a security system, performed as a first embodiment in accordance with the principles of the present invention.

Turning now to the drawings and referring to FIG. 1, a recording process is illustrated for conserving space on a recording medium of a security system, as a first embodiment of the present invention. This process can be configured to include an initialization step 101 for setting the threshold of an allowable amount of motion and setting a reference value of a counter, a recording step 102 of recording a signal picked-up by the camera onto the recording medium, step 103 of checking whether or not an end instruction has been received, step 104 of performing a stop mode when the end instruction is received, a step 105 for detecting the amount of motion present in a recorded video signal, a step 106 of checking whether or not the amount of motion is higher than a threshold value, a step 107 of resetting the counter if the degree of change is higher than the threshold value in step of 106, a step 108 of operating the counter, a step 109 of checking whether the value of the counter is higher than the reference value, and a step 110 of rewinding the medium bearing the recorded video signal until the value of the counter reaches the initial value, if the value of the counter was higher than the reference value.

Figure 3:
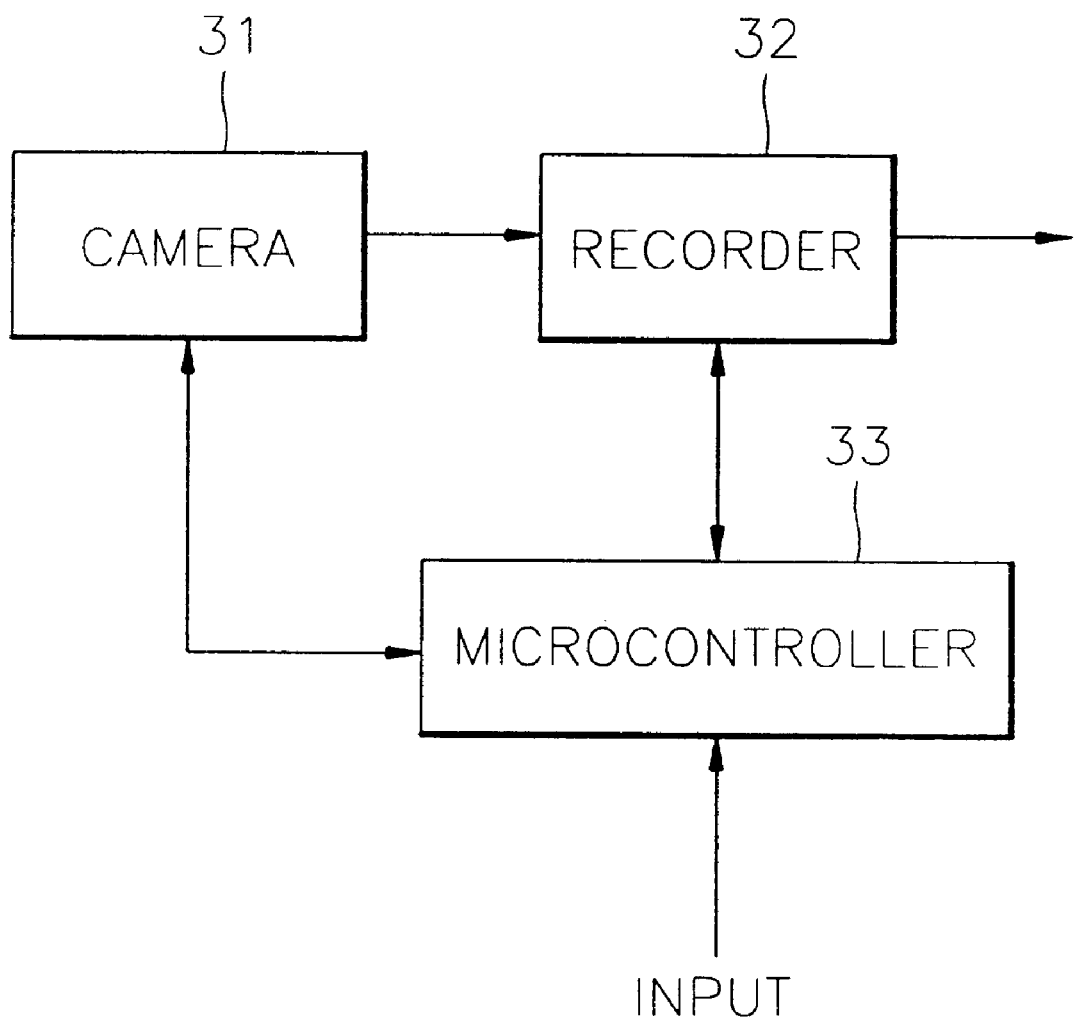
FIG. 3 is a block diagram of a security system constructed for the practice of the present invention.

Referring to FIG. 3, the security system for the practice of the present invention can be constructed with a camera 31 for picking-up an image of an object and then either electrically, or opto-electrically, or optically applying a signal including video images of the object, or other volume under surveillance by the camera, to a recorder 32 such as a video tape recorder, for writing, and thereby recording the picked-up image signal unto a recording medium (e.g., a tape or recordable disk). Microcontroller 33 receives external input, including instructional signals initiated by a human operator, and controls the operation and synchronization between the recorder and the camera. A fine control process that uses microcontroller 33 for controlling the operation of recorder 32, will be described in conjunction with the various embodiments of the present invention.

In one process for recording using a VTR as recorder 32 incorporated into a security system will be described in detail. In initialization step 101, a threshold and a reference value, for comparing to the amount of motion present within a signal and a reference value for a counter, respectively, are established. The threshold value sets the maximum value of the amount of motion amount present in an image signal received from camera 31, below which the image signal is not regarded as an indication of the occurrence of an abnormal situation within the volume under surveillance by camera 31. If the threshold is too high, a subtle motion can not be easily sensed, and if the value of the threshold is too low, even an occurrence exhibiting an amount of motion that represents a very small frame-to-frame, or interframe change is sensed. Therefore, the threshold should be set to a value capable of conserving space on the recording medium.

The reference value of the counter means the minimum length of recording time for rewinding the recording medium in order to conserve space on the recording medium by re-recording subsequent image data over an interval of the recording medium where no motion is present. Accordingly, when the reference value of the counter is too low, the recording mode and the rewinding mode are too often repeated within an interval where no change occurs (i.e., where little or no motion is present in the previously recorded image data). Also, when the reference value of the counter is too high, the interval where no motion occurs becomes excessively long, thereby reducing the extent of conservation of the capacity of the recording medium, while increasing the time required for rewinding the recording medium; recording of image data on the medium is stopped during this hiatus both in order to accommodate the search for low motion segments of previously recorded data and due to the repeated recordation of successive segments of image data onto the same length of the recording medium.

In the step 102 of recording, an image of the volume, or object, under surveillance is picked-up by a guard camera 31 and is recorded onto a recording medium by recorder 32. In step 103, a determination is made by checking for an end instruction, of whether or not an end instruction, corresponding to a keypress or the end of the observing time, has been input into the microcontroller via a peripheral device such as a keypad, keyboard or other user manipulable appliance. In step 104 of performing a stop mode, if an end instruction (i.e., an instruction to terminate the operation of the security system) is determined to have been input to the microcontroller of the security system, recording is stopped and a stop mode is performed.

In step 105 of detecting a motion, when no end instruction is found to have been input in microcontroller 33 of the security system, the amount of motion exhibited by the motion component of the image signals of the volume or the object under surveillance is detected during recording. In order to detect particularly subtle motion of the object, a predetermined cell signal is sampled from a frame unit of the image signal output from camera 31. The sampled electric signal is converted into digital data (e.g., typically binary data), in order to store the converted data in a memory. After reception of a predetermined number of frames, the cell signal is sampled and converted to digital data. Then, the converted data is subtracted from the data stored in the memory in order to detect the amount of motion present in video images of the scene under surveillance.

Also, luminance signals recorded by a VTR can be sampled once every predetermined time period, from a field or frame unit. The luminance levels are converted into digital data and the converted digital data is stored in the memory. The values stored in the memory are compared, in order to thereby detect the amount of motion.

In step 106 of comparing the motion amount, the amount of motion detected in step 105 of detecting a motion, is compared to the threshold value that was predetermined in initialization step 101. At this time, any indication is sensed of whether there has been any change at the place observed by the security system.

If the amount of motion detected is higher than the threshold value, i.e., if an unallowable change has occurred within the security zone, step 107 is performed by resetting a counter before performing again the step of checking whether there motion is present, while the object is still being recorded by the system. If however, the amount of the detected motion is equal to or lower than the threshold value, the change at the security zone is either within allowable limits or is non-existent. At this time, step 108 of counting is performed in order to check the length of a recorded portion, or segment, of the recording medium where either no motion is detected or the level of motion is found to be below the threshold value. After performance of step 108, the first comparison step 109 of comparing a counted value to the reference value 109 is performed, while the counting is continued. If the value counted by the counter is equal to or less than the reference value, the amount of motion present is repeatedly detected, and if the motion is allowable, the counting is continued.

At this time, when the counted value of the counter becomes higher than the reference value, a determination is made that there has been no change within the security zone during a predetermined period of time. Accordingly, the part recorded on the recording medium is unnecessary for the security system. Therefore, in order to overwrite the unnecessarily recorded part of the recording medium, step 110 of rewinding the recording medium is performed.

In the second comparison step 111 of comparing a counting value, the counted value is compared until the counted value becomes zero. That is, the counted value is compared to the allowable value of rewinding the part recorded for a time where the motion amount detected from a security region was lower than the threshold value. When the counted value becomes zero, steps 102 to 111 are again performed. When the security system records a video image of the security zone onto the recording medium, the recorded part of an allowable interval (i.e., an interval exhibiting little or no motion) is overwritten, to thereby conserve space on the recording medium.

Figure 2:
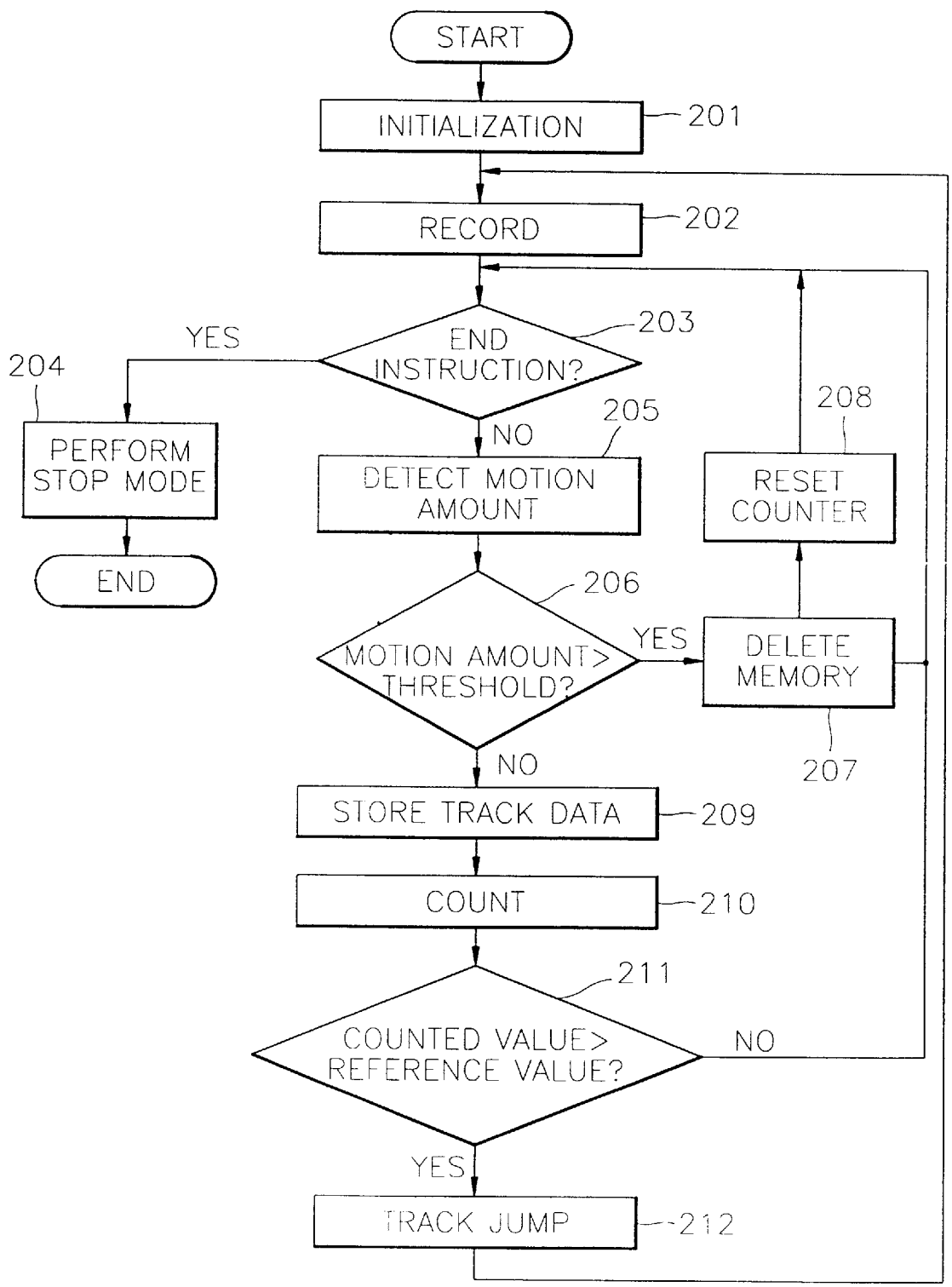
FIG. 2 is a flowchart of a process for recording data while conserving space on a recording medium of a security system, performed as a second embodiment in accordance with the principles of the present invention.

Referring now to FIG. 2, a recording method for conserving space on a recording medium of a security system, according to a second embodiment of the present invention, includes the steps of setting the threshold of an allowable motion amount and setting a reference value of a counter (201), recording a signal picked-up by a security camera on the recording medium (step 202), performing a stop mode in the case that an end instruction is received (steps 203 and 204), detecting a motion amount of a picked-up video signal, deleting track information from a memory in the case that the detected motion amount is higher than the threshold, and resetting a counter (steps 205, 206, 207 and 208), storing track data in the memory, and operating the counter (steps 209 and 210), and carrying out a track jump to a track stored in the memory in the case that the counting value is higher than the reference value (step 212).

The second embodiment is a method for recording an image signal, using a disk as a recording medium of a security system. In the initialization step 201, the threshold of a motion amount, a reference value, and an address value of a memory where track data is stored, are set. As in the first embodiment, the threshold means the maximum value of the motion amount of an image signal received from the camera, below which the image signal is not regarded as that of an abnormal situation. At this time, if the threshold is too high, a subtle motion cannot be sensed, and if the threshold is too low, even a motion amount of a very small change is sensed.

The reference value of the counter means the minimum length of a recording time for performing track jump to conserve space on the recording medium in an interval having no motion. In the recording step 202, the signal picked-up by the security camera is recorded on the recording medium. In the step 203 of checking for an end instruction, it is judged whether an end instruction, according to a keypress or the end of the observing time, is input to the microcontroller.

In the step 204 of performing a stop mode, in the case that the end instruction is input to the microcontroller of the security system, recording is stopped and the stop mode is performed. In the step 205 of detecting a motion, in the case that the end instruction was not input to the microcontroller of the security system, the motion amount of an object input to a camera is detected during recording. In order to detect a subtle motion amount of the object, a predetermined cell signal is sampled from a frame unit of the image signal output from the camera. The sampled electric signal is converted to digital data, to store the converted data in a memory. After predetermined number of frames, the cell signal is sampled and converted to digital data. Then, the converted data is subtracted from the data stored in the memory to thereby detect the motion amount. Also, luminance signals recorded by a video disk recorder, are sampled once every predetermined time period, from a field or frame unit. The luminance levels are converted to digital data and the converted digital data is stored in the memory. The values stored in the memory are compared, to thereby detect a motion amount.

In the step 206 of comparing the motion amount, the motion amount, detected in the step 205 of detecting a motion, is compared to the threshold, predetermined in the initialization step 201. At this time, it is sensed whether there is any change at the place observed by the security system. If the detected motion amount is higher than the threshold, i.e., an unallowable change occurs in the security zone, then before checking again whether a motion occurs, the step 207 of deleting track data from a memory and the step 208 of resetting the counter, are performed.

In the step 209 of storing track data, in the case that the detected motion amount was equal to or lower than the threshold, the recorded track data is stored in the memory. In the counting step 210, counting is performed to check the length of a recorded part of the recording medium, where a motion is not detected or the motion amount is allowable. In the step 211 of comparing a counted value, the counted value of the counter is compared to the reference value, which continues counting. When the counted value becomes higher than the reference value, it is judged that no change has occurred in the security zone during a predetermined period of time. Accordingly, the part recorded on the recording medium is unnecessary for the security system. Therefore, the step 212 of jumping to a track corresponding to the track data stored in the memory, is performed. Accordingly, the part recorded, during the period of time in which it is judged that no change occurred at the security zone, can be overwritten, which conserves space on the recording medium.

As described above, according to the security system of the present invention, motion of a recorded image signal is detected and compared. The recorded part in which no motion occurs for a predetermined period of time is overwritten, which increases the available recording time and conserves space on the recording medium.

What is claimed is:

1. A recording method for conserving space on a recording medium of a security system comprising the steps of:

detecting a motion amount from an image picked up by a camera, while recording the image on the recording medium;

comparing the motion amount to a predetermined threshold, and increasing a counted value when the motion amount does not exceed the predetermined threshold, and alternatively resetting the counted value when the motion amount exceeds the predetermined threshold; and comparing the counted value to a reference value, and rewinding the recording medium back for re-recording until the counted value becomes zero when the counted value exceeds the reference value, and alternatively returning to detection of the motion amount from the image picked up by the camera when the counted value does not exceed the reference value.

2. The recording method of claim 1, wherein the motion amount from the image is detected by comparing luminance components of the image between successive frames of the image picked up by the camera.

3. The recording method of claim 2, wherein said reference value corresponds to a minimum length of a recording time for rewinding the recording medium back to conserve space on the recording medium.

4. The method of claim 3, further comprising the step of interrupting the recording of the image picked up by the camera on the recording medium in response to a stop instruction from a user.

5. The method of claim 1, wherein said recording medium comprises a video tape.

6. The method of claim 1, further comprising the step of interrupting the recording of the image picked up by the camera on the recording medium in response to a stop instruction from a user.

7. A recording method for conserving space on a recording medium of a security system, comprising the steps of:
   detecting a motion amount from an image picked up by a camera, while recording the image on the recording medium containing a plurality of tracks;
   comparing the motion amount to a predetermined threshold, storing track data in a memory corresponding to a track being recorded when said motion amount does not exceed said predetermined threshold, and then beginning counting via a counter;
   deleting the track data stored in said memory and resetting said counter, when said motion amount exceeds said predetermined threshold; and
   comparing a counted value of said counter to a reference value, and reading the track data stored in said memory when said counted value exceeds the reference value, and then moving a recording point back to the track corresponding to the track data stored in said memory for recording the image on said recording medium.

8. The method of claim 7, wherein said recording medium comprises a disk containing said plurality of tracks.

9. The method of claim 7, further comprising the step of interrupting the recording of the image picked up by the camera on the recording medium in response to a stop instruction from a user.

10. A security system, comprising:
    an image pickup unit positioned to monitor a surveillance area, for converting optical information representing at least one object within said surveillance area into an image signal representative of the at least one object;
    a recorder for recording the image signal on a recording tape; and
    a controller electrically connected to said image pickup unit and to said recorder, for controlling said recorder in response to said image pickup unit to record the image signal with minimal space on said recording tape by:
    recording the image signal on said recording tape upon system initialization;
    detecting a motion amount contained in the image signal while recording the image signal on said recording tape;
    comparing the motion amount to a reference threshold;
    when the motion amount exceeds said reference threshold while continuously recording the image signal on said recording tape, resetting a counted value to an initial value;
    when the motion amount does not exceed said reference threshold while continuously recording the image signal on said recording tape, counting in discrete time until the counted value exceeds a reference value indicating no substantial motion within said surveillance area; and
    rewinding said recording tape, until the counted value reaches said initial value, back to a recorded portion for an interval where the image signal containing the motion amount not exceeding said reference threshold is previously recorded, for recording the image signal over said recorded portion of said recording tape to conserve space on said recording tape while monitoring said surveillance area.

11. The security system of claim 10, wherein said reference value corresponds to a minimum length of a recording time for rewinding the recording tape back to conserve space on the recording tape.

12. The security system of claim 11, wherein said controller detects the motion amount from the image signal by comparing luminance components of the image signal between successive frames of images picked up by said image pickup unit.

13. The security system of claim 11, wherein said controller includes an internal counter for counting in discrete time until the counted value exceeds said reference value when the motion amount does not exceed said reference threshold, and for resetting back to said initial value when the motion amount exceeds said reference threshold.

14. The security system of claim 11, wherein said controller controls said recorder to record the image signal on said recording tape continuously until interruption from a user.

15. The security system of claim 11, wherein said image pickup unit comprises a video camera.

16. A security system, comprising:
    an image pickup unit positioned to monitor a surveillance area, for converting optical information representing at least one object within said surveillance area into an image signal representative of the at least one object;
    a recorder for recording the image signal on a recording disk having a plurality of data tracks; and
    a controller electrically connected to said image pickup unit and to said recorder, for controlling said recorder in response to said image pickup unit to record the image signal with minimal space on said recording disk by:
    recording the image signal on successive tracks of said recording disk upon system initialization;
    detecting a motion amount contained in the image signal while recording the image signal on successive tracks of said recording disk;
    comparing the motion amount to a reference threshold;
    when the motion amount exceeds said reference threshold while continuously recording the image signal on successive tracks of said recording disk, deleting track information from an internal memory and resetting a counted value of an internal counter to an initial value;
    when the motion amount does not exceed said reference threshold while continuously recording the image signal on successive tracks of said recording disk, storing track data indicating a specific track of said recording disk on which the image signal is being recorded, in said internal memory, and counting via said internal counter until the counted value exceeds a reference value indicating no substantial motion within said surveillance area; and
    jumping back to said specific track on said recording disk using said track data stored in said internal memory where the image signal containing the motion amount not exceeding said reference threshold is previously recorded, for recording the image signal over said specific track on said recording disk to conserve space on said recording disk while monitoring said surveillance area.

17. The security system of claim 16, wherein said controller detects the motion amount from the image signal by comparing luminance components of the image signal between successive frames of images picked up by said image pickup unit.

18. The security system of claim 16, wherein said internal counter is for counting until the counted value exceeds said reference value when the motion amount does not exceed said reference threshold, and is for resetting back to said initial value when the motion amount exceeds said reference threshold.

19. The security system of claim 16, wherein said controller controls said recorder to record the image signal on said recording disk continuously until interruption from a user.

20. The security system of claim 16, wherein said image pickup unit comprises a video camera.

* * * * *